United States Patent Office 3,174,832
Patented Mar. 23, 1965

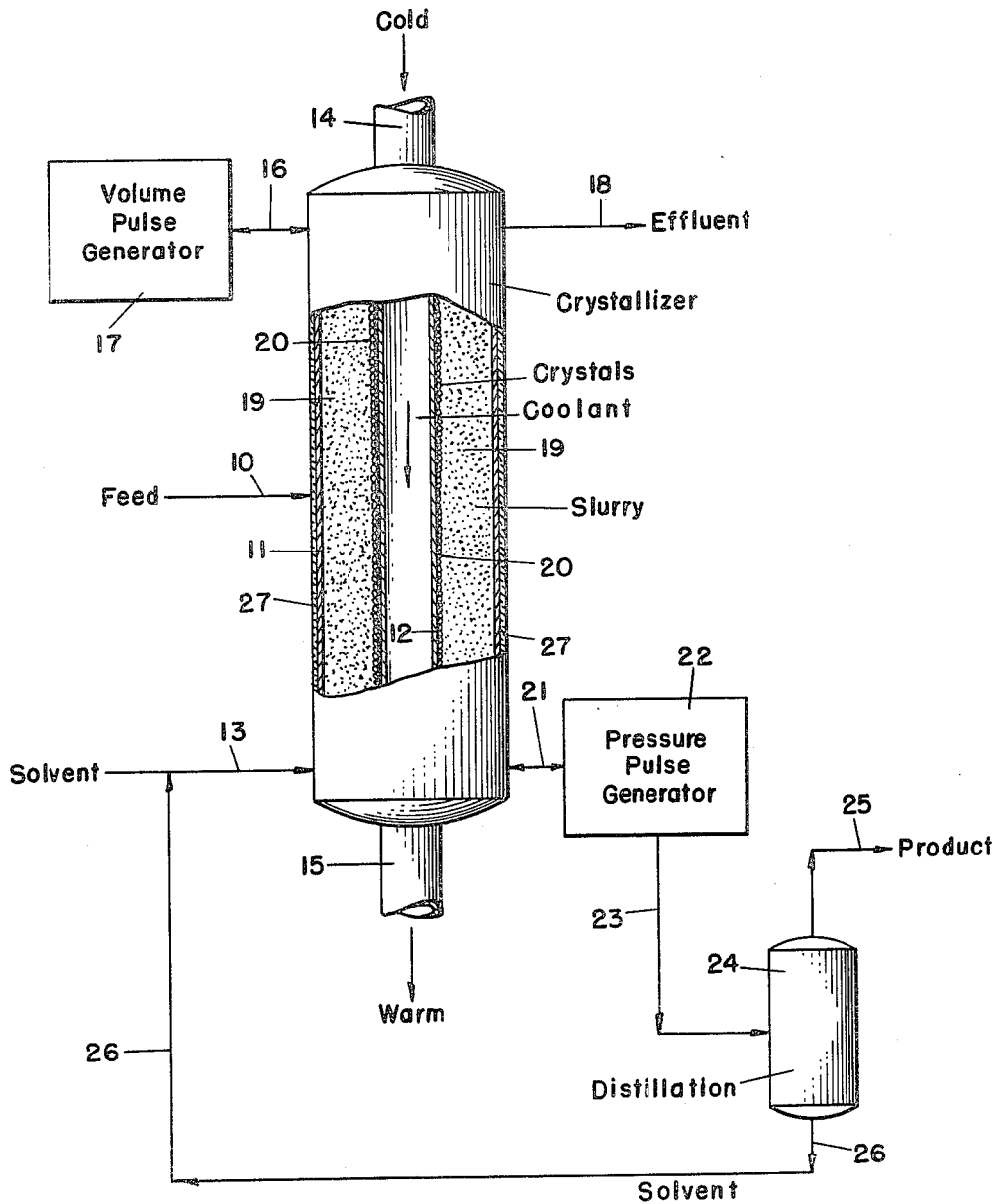

3,174,832
PULSATING FRACTIONAL CRYSTALLIZER
Byron B. Bohrer, Chester, Pa., assignor to Sun Oil Company, Philadelphia, Pa., a corporation of New Jersey
Filed Feb. 21, 1961, Ser. No. 90,838
1 Claim. (Cl. 23—273)

This invention relates to the separation of mixtures of compounds by crystallization. It particularly relates to a method and apparatus for separating a multi-component mixture into higher melting and lower melting fractions by means of fractional crystallization and melting.

It is known that when crystals are frozen from a mother liquor, e.g., the separation of para-xylene from a mixture, it is theoretically possible to attain pure material by a single crystallization. In fact, however, such crystals are usually very impure due to the entrapment of mother liquor within the frozen crystal structure or lattice. This problem is particularly true in the case of petroleum hydrocarbons or other organic compounds. In practice, part of this entrapped mother liquor is removed by pressing, vacuum filtration, centrifuging, and the like.

Additional prior art processes include multiple crystallizations. That is, crystals from one batch are melted and recrystallized until an optimum purity is obtained. In a similar manner, each mother liquor is further chilled with subsequent crystallizations. Thus, the batch-wise operation can separate a multi-component mixture into higher and lower melting fractions but with attendant complexity of equipment and expense. Furthermore, the purity of the product is limited by the number of stages through which the process is carried.

It is an object of this invention to provide a means for separating a multi-component mixture into higher and lower melting fractions. Another object is to provide an improved method for the separation and purification of components of liquid multi-component mixtures. Still another object is to provide a continuous fractional crystallization process. A further object is to provide an apparatus for the continuous separation of mixtures into their components by fractional crystallization. A specific object is to provide a method and apparatus for fractional crystallization using a pulsed pressure cycle synchronized with a pulsed volume cycle in conjunction with a continuous solvent wash. Numerous other objects will fully hereinafter appear.

In the accompanying drawing, FIGURE 1 is a diagrammatic illustration of one embodiment of the present invention, wherein the crystallization apparatus is shown in an elevational view partly in section.

The present invention has both method and apparatus aspects. The invention embraces a method for the separation and purification of components of liquid multi-component mixtures. The separation and purification is effected in a shell and tube apparatus or crystallizer provided with means for applying a pressure pulse synchronized with a volume pulse on the crystallization zone which is defined by the annulus between the shell and the tube of the apparatus. This method preferably comprises the steps of feeding a multi-component mixture into the crystallizer; passing a coolant through the tube in order to produce a temperature gradient between the ends of the zone and to maintain within the crystallizer a temperature such that a portion of the feed mixture will solidify upon change in pressure; feeding wash liquid selective for at least one of the components into the crystallizer at a locus intermediate the feed inlet and warmer end of the crystallizer; subjecting the mixture and liquid to a pressure pulse to alternately melt and solidify portions of the mixture; subjecting the mixture and liquid to a volume pulse to alternately reverse the flow of the melted portion, the volume pulse being synchronized with the pressure pulse such that melt movement is toward the warmer end of the crystallizer during the solidifying cycle of the pressure pulse; removing from the warmer end a component comprising the higher melting fraction; removing from the colder end a component comprising the lower melting fraction; and removing the wash liquid with the fraction for which it is selective.

The invention also embraces an apparatus or pulsating crystallizer for separating by fractional crystallization and melting which comprises, in combination, a shell and tube apparatus comprising a crystallization zone defined by an elongated shell housing at least one tube; means for passing a coolant through said tube thereby to produce a temperature gradient between the ends of said zone; means for applying a pressure pulse to said zone; means for applying a volume pulse to said zone synchronized with said pressure pulse; feed inlet to said apparatus; wash liquid inlet to said apparatus located intermediate feed inlet and the warmer end of said apparatus; and product outlets located adjacent the warmer and colder ends of said apparatus.

Reference will now be made to the appended drawing.

FIGURE 1 shows in partial cross-section a vertical column, tower, apparatus, or crystallizer 11. Extending through the center of the apparatus 11 is tube 12. Even though the apparatus is illustrated as having only one tube running therethrough it is understood that this element of the apparatus can be arranged in a bundle of two or more or up to 100–200 tubes depending upon the application. In short, apparatus 11 can have the physical arrangement of a conventional shell and tube heat exchanger. Further, it is understood that apparatus 11 can be either vertically disposed or horizontally disposed rather than vertical as illustrated. Suitable insulation 27 is provided as a jacket around crystallizer 11.

Means 14 are provided for passing a coolant into tube 12 and means 15 are provided for withdrawing the coolant. Volume pulse generator 17 is connected to crystallizer 11 by means of line 16. The pressure pulse generator 22 is connected to crystallizer 11 through line 21. Distillation tower 24 is provided as a means for recovering product from solvent.

In the apparatus shown, the volume pulse generator 17 and the pressure pulse generator 22 are positioned at the colder and warmer ends of the crystallizer 11, respectively. It is to be understood, however, that generators 17 and 22 may be positioned in any relation to each other and/or to the apparatus.

As used herein, the pressure pulse generator can be of any type known to the art. Conventionally, the pressure generator is a piston acting on a gas-filled or liquid-filled reservoir such that the desired peak pressure can be reached almost instantaneously. The piston is driven by any suitable power source (not shown) such as an electric motor, a gas turbine, a reciprocating engine, or the like. Depending upon the characteristics of the feed material and the wash liquid used, the pressure rise during a cycle preferably is from 1000 to 2000 pounds per square inch (p.s.i.) but may be as high as 5000–10,000 pounds per square inch or as low as 100–200 p.s.i.

Further, as used herein, the volume pulse generator can be of any type known to the art. Conventionally, the volume generator is a long stroke piston arrangement such that the stroke of the piston moves the liquid melt in the crystallizer a distance less than the length of the crystallization zone. Usually the volume of melt moved is 0.1 to 0.5 times the volume of the crystallization zone. The piston is driven by any suitable power source (not shown)

such as an electric motor, gas turbine, reciprocating engine, or the like.

As illustrative of the operation of the pulsating crystallizer, a multi-component mixture, which it is desired to separate into higher melting and lower melting fractions, is charged into column 11 through inlet 10. An at least partially immiscible wash liquid, e.g., solvent, selective for one of the components is admitted through line 13. A coolant or refrigerant is passed through tube 12 thereby creating a temperature gradient through the crystallization zone and providing a temperature within the zone such that a portion of the charge mixture solidifies upon a change in pressure. The temperature gradient usually will be 10–15° F. However, for particular applications, the gradient may range from 5–100° F. The warmer end of the crystallization zone should be maintained at a temperature of or above the melting point of the desired higher melting fraction.

When crystallizer 11 is filled with the charge mixture and solvent, the pressure pulse generator and the volume pulse generator are started and timed to operate in the proper synchronized sequence. First, a pressure pulse of, say, 2,000 pounds per square inch (p.s.i.) is imposed on the system through line 21 thereby solidifying a portion of the mixture. The crystals, so formed, adhere to tube 12 as a layer 20 and create a slurry 19 within the crystallization zone. Next, while the pressure is at the relatively high level, a volume pulse is imposed through line 16 on the slurry and moves the slurry in the direction of the warmer end of the crystallization zone. A portion of the higher melting point fraction is removed through line 21, through the reservoir of pressure pulse generator 22, into distillation tower 24. The higher melting product is recovered overhead through line 25 and any solvent recovered is returned via lines 26 and 13 into crystallizer 11. A portion of the lower melting fraction is removed as a slurry in solvent through line 18 and may be recovered in a manner similar to that described for the higher melting fraction.

The pressure is next released thereby causing a portion of the crystals to melt. The volume pulse is now reversed so that the new equilibrium slurry is moved in the direction of the colder end of the crystallization zone. Again, higher melting product is withdrawn through line 21 and lower melting product withdrawn through line 18.

The pressure pulse again raises the pressure on the crystallization zone causing additional formation of crystals on the tube as layer 20 and as slurry 19. The above mentioned procedure is now repeated.

From high pressure to high pressure is defined herein as one cycle. The apparatus may be subjected to from 0.1–100 cycles per minute depending upon the characteristics of the charge and the desired purity of the fractions. The product removal can be continuous or can be synchronized with the pulsations. It is preferable that the feed be fed continuously although for certain applications it, too, can be intermittent and/or synchronized with the pulsations. In all cases, the wash liquid should be fed continuously.

It is noted from the above description that the only movement within the apparatus is the movement of liquid. In this manner, the present invention avoids plugging of equipment which is attendant those processes which move a bed of crystals. It is also noted that the crystals are continually washed with solvent thereby providing a means for obtaining extremely high purity product.

The method and apparatus of the present invention are useful for the separation of simple binary systems or the complex multi-component system. However, as used herein, the term "multi-component" includes the binary system. These systems can be solid solution systems as well as the eutectic-forming systems. The invention is particularly applicable to the separation of hydrocarbons which have practically the same boiling points and are, therefore, difficult to separate by distillation. Further, the invention is applicable to the dewaxing of oil and/or the deoiling of wax. Other specific examples of utility include the separation of systems containing xylenes, cyclohexane, normal paraffins, benzene, or the like. Additionally, the isomers of dimethyl or dialkylnaphthalenes may be separated, e.g., 2,6-dimethylnaphthalene can be separated for 2,7-dimethylnaphthalene. The invention also offers a practical method of separating inorganic components between which solvates and hydrates are formed. In general, the invention can be used for any separation that can be accomplished by crystallization. It is particularly useful for the solid solution systems.

Those skilled in the art will recognize that certain modifications may be made in my process and certain substitutions made in my apparatus without departing from the spirit and scope of the invention as defined by the following claim.

I claim:

A crystallizing zone in which a solute is crystallized by heat exchange and cooling comprising in combination a shell and tube apparatus comprising a crystallizing zone defined by an elongated shell housing at least one tube; means for passing a coolant through said tube to produce a temperature gradient between its ends; means for applying a cyclic pressure pulse outside of, independent of and communicating with said zone; means of applying a cyclic volume pulse outside of, independent of and communicating with said crystallizing zone; said volume pulse being independent of and synchronized with said pressure pulse; feed inlet to said apparatus located intermediate the warmer and colder ends of said apparatus; wash liquid inlet to said apparatus located intermediate feed inlet and warmer ends of said apparatus; product outlets located adjacent the warmer and colder ends of said apparatus; and distillation means adjacent to and communicating with each product outlet of said crystallizing zone.

References Cited by the Examiner
UNITED STATES PATENTS

| | | | |
|---|---|---|---|
| 1,951,923 | 3/34 | Cartoux | 23—273 |
| 2,603,667 | 7/52 | Pankratz et al. | 23—273 X |
| 2,615,794 | 10/52 | Shelby | 23—273 |
| 2,617,273 | 11/52 | Findlay | 62—58 |
| 2,731,456 | 1/56 | Weedman | 62—58 |
| 2,822,249 | 2/58 | Jones | 23—310 |
| 2,890,962 | 6/59 | Eddy | 62—58 |
| 2,891,099 | 6/59 | Skinner | 260—674 X |
| 2,895,835 | 7/59 | Findlay | 62—58 |

NORMAN YUDKOFF, *Primary Examiner.*

JAMES H. TAYMAN, *Examiner.*